J. L. ROW.
BOLTING-REEL.
No. 174,008. Patented Feb. 22, 1876.
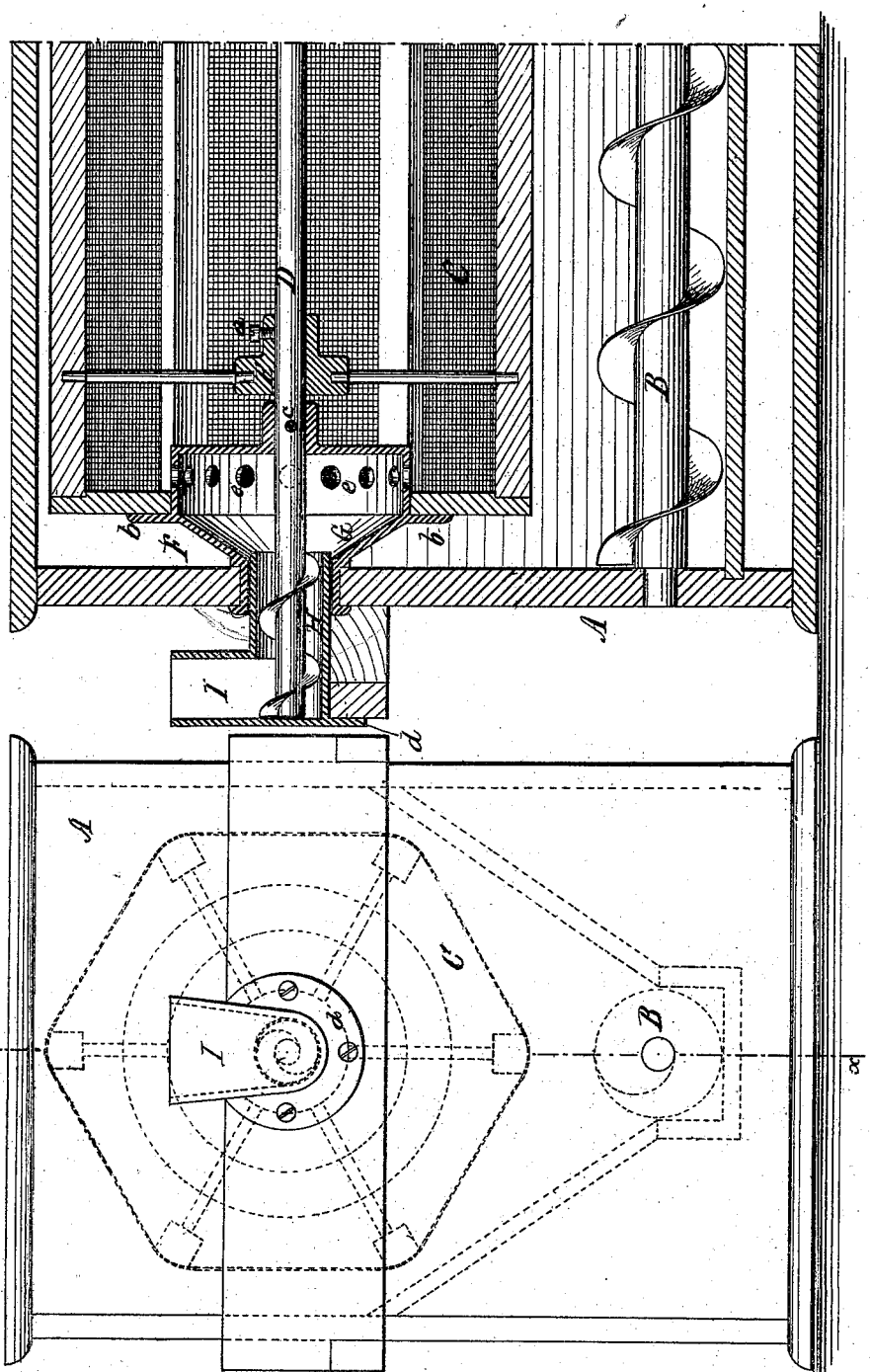

UNITED STATES PATENT OFFICE.

JOHN L. ROW, OF BOWLING GREEN, KENTUCKY.

IMPROVEMENT IN BOLTING-REELS.

Specification forming part of Letters Patent No. 174,008, dated February 22, 1876; application filed December 20, 1875.

*To all whom it may concern:*

Be it known that I, JOHN L. ROW, of Bowling Green, in the county of Warren and State of Kentucky, have invented certain new and useful Improvements in Bolting-Reels; and I do hereby declare that the following is a full and exact description thereof, reference being had to the accompanying drawings, making a part of this application.

My invention relates to a novel construction of reels for bolting flour; and has for its object to prevent the escape of any specks or foreign matter from the reel into the chest.

With these ends and objects in view, my invention consists in forming the reel with solid or closed end, and providing one of said ends with a central hollow conical distributer, adapted to rotate with the reel and shaft, the latter terminating in a worm or screw feeder, and projecting into the feed-hopper, the cone being provided with holes around the circumference of that portion lying within the reel, and through which the flour conveyed or taken in by the feeder is distributed radially within the reel.

To make those skilled to more fully understand my invention, I will proceed to describe its construction and operation, referring by letters to the accompanying drawing, in which—

Figure 1 is an end elevation of my improved reel arranged above an ordinary meal-chest, and Fig. 2 is a longitudinal vertical section, (the shaft not being shown in section.)

Similar letters indicate like parts in both figures.

A represents the closed meal-chest, with its spiral conveyer B arranged as usual. C is the reel mounted upon a central shaft D, and secured rigidly thereto by set-screws $a$, passing through the hubs E of the skeleton-frame. F represents one of the closed heads of the reel. This end is cut away centrally, and filled up with a hollow cone, G, provided with a flange, $b$, for securing it by bolts to the head of the reel. The outer end of the cone is formed on its exterior to rotate within a suitable slot in the chest, and the inner end terminates with a hollow cylindrical bearing, through which, and the opposite end, the shaft D passes. The cone G is secured to the shaft by a set-screw, $c$. The bearing of the cone G consists of a hollow cylinder, H, forming part of the hopper I, which is provided with an annular flange, $d$, by which it is secured permanently to the end of the chest, and in line with the axis of the bearing of the opposite end of the shaft D. That part of the cone G through which the meal finds its exit to the reel is cylindrical in form, and is provided with a series of holes, $e$, so that the meal is distributed radially and more uniformly than if it were allowed to escape in a body.

Operation: The meal being fed to the hopper I, and the reel set in motion, the conveyer on the end of the shaft, rotating within the hopper, conveys the meal within the hollow cone G, from whence it is distributed through the series of holes $e$ radially onto the interior surface of the reel.

What I claim as new, and desire to secure by Letters Patent, is—

1. In combination with the closed head of the reel and shaft D, provided with a conveyer at one end, the cone G, provided with radial holes or openings, whereby the meal is conducted to, and distributed radially within, the reel, substantially as and for the purposes set forth.

2. The hopper I, constructed as described, to form a bearing for the cone G, and provided with an annular flange for securing it in position, substantially as set forth.

3. The cone G, provided with the cylindrical extension and set-screw $c$, whereby the cone is secured to the shaft, as hereinbefore set forth.

Witness my hand and seal this 10th day of December, 1875.

JOHN L. ROW. [L. S.]

Witnesses:
JOHN L. STOUT,
WILL. A. COOKE.